(12) United States Patent  (10) Patent No.: US 7,459,236 B2
Konishiike et al.  (45) Date of Patent: Dec. 2, 2008

(54) BATTERY

(75) Inventors: Isamu Konishiike, Fukushima (JP);
Kenichi Kawase, Fukushima (JP);
Kotaro Satori, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 11/245,560

(22) Filed: Oct. 7, 2005

(65) Prior Publication Data

US 2006/0083987 A1 Apr. 20, 2006

(30) Foreign Application Priority Data

Oct. 18, 2004 (JP) ............................. P2004-303376

(51) Int. Cl.
*H01M 4/58* (2006.01)
(52) U.S. Cl. .................................... 429/218.1
(58) Field of Classification Search ............... 429/218.1
See application file for complete search history.

(56) References Cited

FOREIGN PATENT DOCUMENTS

| JP | 08-050992 | 2/1996 |
| JP | 11-135115 | 5/1999 |
| JP | 11/339777 | 12/1999 |
| JP | 2004-349162 | * 12/2004 |
| WO | WO 01/29912 | 4/2001 |
| WO | WO 01/31721 | 5/2001 |

* cited by examiner

*Primary Examiner*—Patrick Ryan
*Assistant Examiner*—Thomas H. Parsons
(74) *Attorney, Agent, or Firm*—Bell, Boyd & Lloyd LLP

(57) ABSTRACT

A battery capable of improving cycle characteristics is provided. An anode active material layer is alloyed with an anode current collector at least in part of the interface with the anode current collector. The anode active material layer contains silicon and oxygen as an element. The average oxygen content in the anode active material layer is 40 atom % or less. When the average oxygen content on the current collector side is A and the average oxygen content on the surface side is B where the anode active material layer is divided into two in the thickness direction, the average oxygen content on the current collector side A is larger than the average oxygen content on the surface side B, and the difference therebetween, A–B is from 4 atom % to 30 atom %.

6 Claims, 5 Drawing Sheets

BATTERY

CROSS REFERENCES TO RELATED APPLICATIONS

The present application claims priority to Japanese Patent Application JP 2004-303376 filed in the Japanese Patent Office on Oct. 18, 2004, the entire contents of which being incorporated herein by reference.

BACKGROUND

The present invention relates to an anode in which an anode current collector is provided with an anode active material layer, and a battery using it.

In recent years, in connection with high-performance and multi-function of mobile devices, high capacities of secondary batteries, the power source for the mobile devices have been desired earnestly. As a secondary battery, which meets such a demand, there is a lithium secondary battery. However, in the case of using lithium cobaltate for a cathode and graphite for an anode, which is currently a typical mode for the lithium secondary batteries, the battery capacity is in a saturated state, and it is extremely difficult to greatly obtain a high capacity of the battery. Therefore, from old times, using metallic lithium (Li) for an anode has been considered. However, in order to put such an anode to practical use, it is necessary to improve efficiency of precipitation and dissolution of lithium and to control dendrite precipitation form.

Meanwhile, a high capacity anode using silicon (Si), tin (Sn) or the like has been actively considered recently. However, when charge and discharge is repeated, such high capacity anodes are pulverized and miniaturized due to significant expansion and shrinkage of the active material, current collecting characteristics are lowered, and decomposition reaction of the electrolytic solution is promoted due to the increased surface area, so that the cycle characteristics are extremely poor. Therefore, an anode in which the anode active material layer is formed on the anode current collector by vapor-phase deposition method, liquid-phase deposition method, firing method, or thermal spraying process has been considered (for example, refer to Japanese Unexamined Patent Application Publication Nos. H08-50992 and H11-135115, and Japanese Patent No. 2948205). According to such an anode, compared to a traditional coating type anode, in which a slurry containing a particulate active material, a binder and the like is coated, miniaturization can be inhibited, and the anode current collector and the anode active material layer can be integrated. Therefore, electronic conductivity in the anode becomes extremely excellent, and high performance in terms of capacity and cycle life is expected.

However, even in the anode in which the anode current collector and the anode active material layer are integrated, as the active material is expanded and shrunk, the anode current collector and the anode active material layer are separated, and it is difficult to obtain sufficient characteristics. Therefore, for example, a technique, in which by diffusing components of the anode current collector into the anode active material layer, contact characteristics between the anode current collector and the anode active material layer are improved and expansion and shrinkage in the diffusion region are inhibited has been reported (for example, refer to International Publication No. WO01/029912). Further, a technique in which impurity is added to an anode active material layer to obtain a gradient structure, in which the impurity concentration is changed in the thickness direction has been reported (for example, refer to International Publication No. WO01/031721).

However, even in the case of using such techniques, there have been disadvantages that it is difficult to sufficiently inhibit expansion and shrinkage of the anode active material layer, and to improve battery characteristics such as cycle characteristics.

SUMMARY

In view of the foregoing disadvantages, it is desirable to provide an anode capable of inhibiting expansion and shrinkage and improving battery characteristics such as cycle characteristics, and a battery using it.

According to an embodiment of the present invention, there is provided a first anode having an anode current collector; and an anode active material layer, which is provided on the anode current collector, and which is alloyed with the anode current collector at least in part of the interface with the anode current collector, in which the anode active material layer contains silicon and oxygen (O) as an element, the average oxygen content in the anode active material layer is 40 atom % or less, and when the average oxygen content on the current collector side is A and the average oxygen content on the surface side is B where the anode active material layer is divided into two in the thickness direction, the average oxygen content on the current collector side A is larger than the average oxygen content on the surface side B, and the difference therebetween, A−B is from 4 atom % to 30 atom %.

According to an embodiment of the present invention, there is provided a second anode having an anode current collector; and an anode active material layer which is formed on the anode current collector by at least one method from the group consisting of vapor-phase deposition method, thermal spraying process, and firing method, in which the anode active material layer contains silicon and oxygen as an element, the average oxygen content in the anode active material layer is 40 atom % or less, and when the average oxygen content on the current collector side is A and the average oxygen content on the surface side is B where the anode active material layer is divided into two in the thickness direction, the average oxygen content on the current collector side A is larger than the average oxygen content on the surface side B, and the difference therebetween, A−B is from 4 atom % to 30 atom %.

According to an embodiment of the present invention, there is provided a first battery including a cathode; an anode; and an electrolyte, in which the anode has an anode current collector and an anode active material layer which is provided on the anode current collector, and which is alloyed with the anode current collector at least in part of the interface with the anode current collector, the anode active material layer contains silicon and oxygen as an element, the average oxygen content in the anode active material layer is 40 atom % or less, and when the average oxygen content on the current collector side is A and the average oxygen content on the surface side is B where the anode active material layer is divided into two in the thickness direction, the average oxygen content on the current collector side A is larger than the average oxygen content on the surface side B, and the difference therebetween, A−B is from 4 atom % to 30 atom %.

According to an embodiment of the present invention, there is provided a second battery including: a cathode; an anode; and an electrolyte, in which the anode has an anode current collector and an anode active material layer which is formed on the anode current collector by at least one method from the group consisting of vapor-phase deposition method, thermal spraying process, and firing method, the anode active material layer contains silicon and oxygen as an element, the average oxygen content in the anode active material layer is 40 atom % or less, and when the average oxygen content on the current collector side is A and the average oxygen content on the surface side is B where the anode active material layer is divided into two in the thickness direction, the average oxygen content on the current collector side A is larger than the average oxygen content on the surface side B, and the difference therebetween, A−B is from 4 atom % to 30 atom %.

According to the anode of the embodiment of the present invention, the average oxygen content in the anode active material layer is 40 atom % or less, and the average oxygen content on the current collector side A is larger than the average oxygen content on the surface side B, and the difference therebetween, A−B is from 4 atom % to 30 atom %. Therefore, expansion and shrinkage of the anode active material layer can be inhibited. For example, when the anode according to the embodiment of the present invention is applied to the battery according to the embodiment of the present invention, battery characteristics such as cycle characteristics can be improved.

In particular, when the average oxygen content in the anode active material layer is 10 atom % or more, higher effects can be obtained.

Additional features and advantages are described herein, and will be apparent from, the following Detailed Description and the figures.

DETAILED DESCRIPTION

An embodiment of the present invention will be hereinafter described in detail with reference to the drawings.

Figure 1:
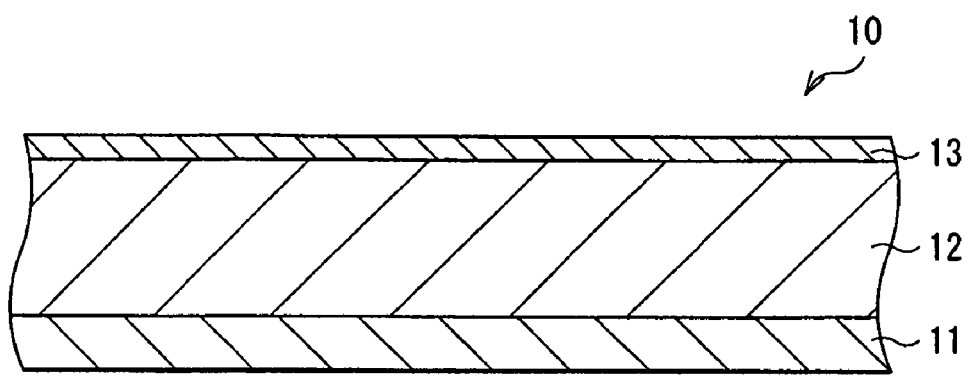
FIG. 1 is a cross section showing a structure of an anode according to an embodiment of the present invention.

FIG. 1 shows a simplified structure of an anode according to an embodiment of the present invention. An anode 10 has, for example, an anode current collector 11 and an anode active material layer 12 provided on the anode current collector 11. The anode active material layer 12 can be formed on both sides or a single side of the anode current collector 11. Further, on the surface of the anode active material layer 12, a coating 13 including, for example, an oxide or a hydroxide is formed.

The anode current collector 11 is preferably made of a metal material containing at least one of metal elements which do not form an intermetallic compound with lithium.

When the intermetallic compound is formed with lithium, expansion and shrinkage arise due to charge and discharge, structural disorder arises, and current collecting characteristics are lowered. In addition, an ability to support the anode active material layer 12 becomes small, and therefore the anode active material layer 12 easily separates from the anode current collector 11. Examples of the metal element which does not form an intermetallic compound with lithium include copper (Cu), nickel (Ni), titanium (Ti), iron (Fe), and chromium (Cr).

Specially, metal elements which are alloyed with the anode active material layer 12 are preferable. As described below, when the anode active material layer 12 contains silicon as an element, the anode active material layer 12 is significantly expanded and shrunk due to charge and discharge, and therefore is easily separated from the anode current collector 11. However, by making an alloy of the anode active material layer 12 and the anode current collector 11 to obtain strong adhesion thereof, separation of the anode active material layer 12 from the anode current collector 11 can be inhibited. As a metal element which does not form an intermetallic compound with lithium, and which is alloyed with the anode active material layer 12, that is, which is alloyed with silicon, copper, nickel, and iron can be cited. In view of strength and conductivity, copper, nickel, and iron is preferable.

The anode current collector 11 can include a single layer, or several layers. In the latter case, it is possible that a layer contacting with the anode active material layer 12 is made of a metal material which is alloyed with silicon, and the other layers are made of other metal materials. Further, the anode current collector 11 is preferably made of a metal material consisting of at least one metal element which does not form an intermetallic compound with lithium, except for the interface with the anode active material layer 12.

The anode active material layer 12 contains silicon as an element, which has a high ability to insert and extract lithium, and can provide a high energy density. Silicon can be contained in the form of a simple substance, an alloy, or a compound.

The anode active material layer 12 is preferably formed by at least one method from a group consisting of vapor-phase deposition method, thermal spraying process, and firing method. The reason thereof is that destruction due to expansion and shrinkage of the anode active material layer 12 due to charge and discharge can be inhibited, the anode current collector 11 and the anode active material layer 12 can be integrated, and electronic conductivity in the anode active material layer 12 can be improved. In addition, a binder, voids and the like can be reduced or excluded, and the anode 10 can become a thin film. In the specification, "forming the active material layer by firing method" means forming a denser layer having a higher volume density than before heat treatment by performing heat treatment for a layer formed by mixing powders containing an active material and a binder under a non-oxidizing atmosphere or the like.

Further, the anode active material layer 12 is preferably alloyed with the anode current collector 11 at least in part of the interface with the anode current collector 11, in order to prevent the anode active material layer 12 from separating from the anode current collector 11 due to expansion and shrinkage. Specifically, it is preferable that at the interface therebetween, the element of the anode current collector 11 is diffused in the anode active material layer 12, or the element of the anode active material layer 12 is diffused in the anode current collector 11, or the both elements are diffused in each other. In the present invention, diffusion of elements described above is included as a form of alloying.

Further, the anode active material layer 12 contains oxygen as an element. This is because expansion and shrinkage of the anode active material layer 12 can be prevented. Oxygen may be bonded with silicon, or not. The oxygen content on the anode current collector 11 side is preferably larger than on the surface side. When the average oxygen content on the current collector side is A and the average oxygen content on the surface side is B where the anode active material layer 12 is divided into two in the thickness direction, the difference therebetween, A−B is preferably from 4 atom % to 30 atom %. Further, the average oxygen content in the anode active material layer 12 is preferably 40 atom % or less, more preferably 10 atom % or more. Thereby, expansion and shrinkage of the anode active material layer 12 particularly on the anode current collector 11 side can be effectively inhibited.

The average oxygen content is obtained as follows, for example. A cross section of the anode active material layer 12 is clipped by FIB (Focused Ion Beam), a composition in the thickness direction of the anode active material layer 12 is measured for a plurality of given measuring-points by line analysis of the cross section using AES (Auger Electron Spectroscopy), and then the results are averaged. The larger number of measuring-point is preferable. For example, the number of measuring point is preferably randomly selected 5 points or more, and more preferably randomly selected 10 points or more. Further, the interface between the anode active material layer 12 and the anode current collector 11 is to be the location where the silicon content and the content of the metal element composing the anode current collector 11 are inverted. In other words, the anode active material layer 12 is started from the location where the silicon content becomes larger than the content of the metal element composing the anode current collector 11. The interface between the anode active material layer 12 and the coating 13 is, for example, to be the location where the silicon content and the content of the element other than silicon are inverted. That is, the anode active material layer 12 is ended at the location where the silicon content is larger than the content of other element. Further, in calculating the average oxygen content, if cracks or the like exist in the anode active material layer 12, such location having cracks or the like is excluded from the calculation.

The anode 10 can be manufactured as follows, for example.

First, for example, the anode current collector 11 made of a metal foil is prepared, and the anode active material layer 12 is deposited on the anode current collector 11 by depositing an anode active material by vapor-phase deposition method or thermal spraying process. Otherwise, after a precursor layer containing a particulate anode active material is formed on the anode current collector 11, the anode active material layer 12 can be deposited by firing method. Further, the anode active material layer 12 can be deposited by combining two or three methods of vapor-phase deposition method, thermal spraying process, and firing method.

When vapor-phase deposition method or thermal spraying process is used, oxygen is added to the anode active material layer 12 by introducing oxygen into the atmosphere. The distribution of oxygen in the anode active material layer 12 can be controlled by adjusting the oxygen concentration or the like in the atmosphere. Further, it is possible to form two layers having respectively different oxygen content. When firing method is used, for example, oxygen is added by forming a precursor layer by mixing silicon oxide powders with a particulate anode active material. The distribution of oxygen can be adjusted by forming the precursor layer divided into a plurality of layers having respectively different amounts of silicon oxide powders to be mixed, for example. As vapor-phase deposition method, physical deposition method or chemical deposition method can be cited. Specifically, vacuum deposition method, sputtering method, ion plating method, laser ablation method, CVD (Chemical Vapor Deposition) method or the like can be cited. As thermal spraying process, any process such as plasma spraying process, high-velocity gas flame spraying process, and arc spraying process can be used. Regarding firing method, known techniques can be utilized. For example, atmosphere firing method, reaction firing method, or hot press firing method can be used.

In some cases, by using such vapor-phase deposition method, thermal spraying process, or firing method, the anode active material layer 12 and the anode current collector 11 are alloyed at least in part of the interface. However, it is possible that after the anode active material layer 12 is deposited, heat treatment is provided under the vacuum atmosphere or the non-oxygenic atmosphere, and alloying is made. Further, in some cases, after the anode active material layer 12 is formed, the coating 13 is formed by natural oxidation. However, the coating 13 according to purposes can be formed if necessary. Thereby, the anode 10 shown in FIG. 1 is obtained.

The anode 10 is used for, for example, a secondary battery as below.

Figure 2:
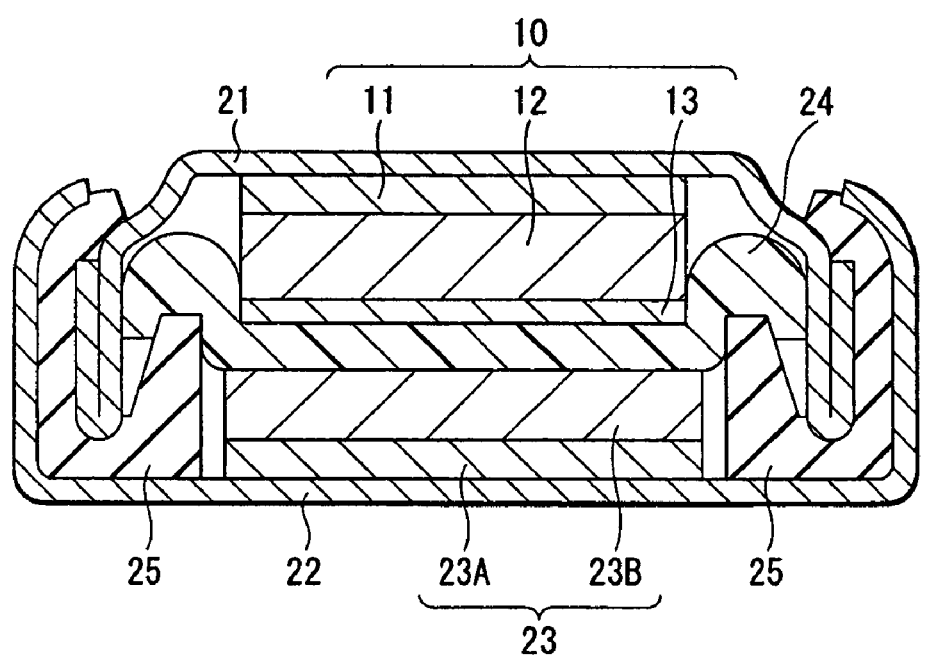
FIG. 2 is a cross section showing a structure of a secondary battery using the anode shown in FIG. 1.

FIG. 2 shows a structure of the secondary battery. The secondary battery is a so-called coin type secondary battery. The anode 10 housed in package cup 21 and a cathode 23 housed in package can 22 are layered with a separator 24 in between.

Peripheral edges of the package cup 21 and the package can 22 are hermetically sealed by being caulked through an insulative gasket 25. The package cup 21 and the package can 22 are made of, for example, a metal such as stainless and aluminum, respectively.

The cathode 23 has, for example, a cathode current collector 23A and a cathode active material layer 23B provided on the cathode current collector 23A. Arrangement is made so that the cathode active material layer 23B side is face to the anode active material layer 12. The cathode current collector 23A is made of, for example, aluminum, nickel, or stainless.

The cathode active material layer 23B contains, for example, one or more of cathode materials capable of inserting and extracting lithium as a cathode active material. The cathode active material layer 23B can also contain a conductive material such as a carbon material and a binder such as polyvinylidene fluoride if necessary. As a cathode material capable of inserting and extracting lithium, for example, a lithium-containing metal complex oxide expressed by a general formula of $Li_xMIO_2$ is preferable. Since the lithium-containing metal complex oxide can generate a high voltage and has a high density, a higher capacity of the secondary battery can be obtained. MI represents one or more transition metals, and is preferably at least one of cobalt and nickel. x varies according to a charge and discharge state of the battery, and is generally in the range of $0.05 \leq x \leq 1.10$. Specific examples of the lithium-containing metal complex oxide include $LiCoO_2$, $LiNiO_2$ and the like.

The cathode 23 can be formed, for example, by forming the cathode active material layer 23B by mixing a cathode active material, a conductive material, and a binder to prepare a mixture, dispersing the mixture in a dispersion medium such as N-methyl-2-pyrrolidone to form a mixture slurry, coating the cathode current collector 23A made of a metal foil with the mixture slurry, drying the resultant, and then compression-molding the resultant.

The separator 24 is intended to separate the cathode 23 from the anode 10, prevent current short circuit due to contact between the cathode and the anode, and let through lithium ions. The separator 24 is made of, for example, polyethylene or polypropylene.

An electrolytic solution, the liquid electrolyte is impregnated in the separator 24. The electrolytic solution contains, for example, a solvent and an electrolyte salt dissolved in the solvent. The electrolytic solution can also contain additives if necessary. Examples of the solvent include nonaqueous solvents such as ethylene carbonate, propylene carbonate, dimethyl carbonate, diethyl carbonate, and ethyl methyl carbonate. One kind of solvent can be used singly, or two or more solvents can be used by mixing.

Examples of the electrolyte salt include lithium salts such as $LiPF_6$, $LiCF_3SO_3$, and $LiClO_4$. One kind of electrolyte salt can be used singly, or two or more electrolyte salts can be used by mixing.

The secondary battery can be manufactured by, for example, layering the anode 10, the separator 24 in which the electrolytic solution is impregnated, and the cathode 23, inserting the layered body in the package cup 21 and the package can 22, and providing caulking thereto.

In the secondary battery, when charged, for example, lithium ions are extracted from the cathode 23, and are inserted in the anode 10 through the electrolytic solution. When discharged, for example, lithium ions are extracted from the anode 10, and are inserted in the cathode 23 through the electrolytic solution. Then, since oxygen is contained in the anode active material layer 12 as an element, and the average oxygen content on the current collector side A is larger than the average oxygen content on the surface side B as described above, expansion and shrinkage of the anode active material layer 12 due to charge and discharge, in particular, expansion and shrinkage in the vicinity of the anode current collector 11 are inhibited. Therefore, the anode active material layer 12 is inhibited from separating from the anode current collector 11.

The anode 10 according to this embodiment can be used for the following secondary battery as well.

Figure 3:
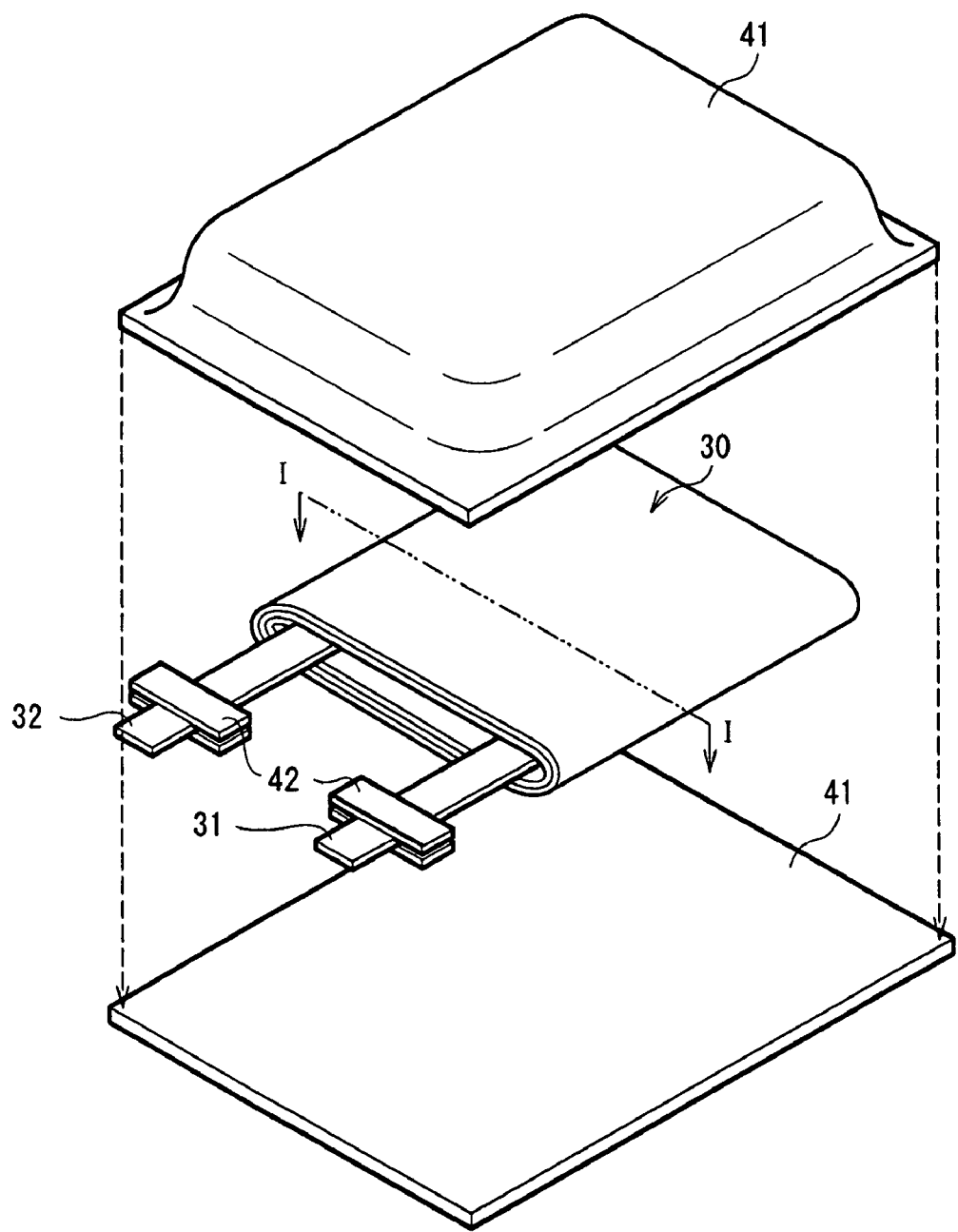
FIG. 3 is an exploded perspective view showing a structure of another secondary battery using the anode shown in FIG. 1.

FIG. 3 shows a structure of the secondary battery. In the secondary battery, a spirally wound electrode body 30 to which leads 31 and 32 are attached is housed inside a film package member 41, and the size, the weight and the thickness thereof can be reduced.

The leads 31 and 32 are directed from inside of the package member 41 to outside thereof, and, for example, are derived in the same direction. The leads 31 and 32 are respectively made of a metal material such as aluminum, copper, nickel, and stainless, and are respectively in the shape of a thin plate or in the shape of a net.

The package member 41 is made of an aluminum laminated film in the shape of a rectangle, in which, for example, a nylon film, an aluminum foil, and a polyethylene film are bonded together in this order. The package member 41 is, for example, arranged so that the polyethylene film side and the spirally wound electrode body 30 are face to each other, and respective outer edge portions thereof are adhered to each other by fusion bonding or an adhesive. An adhesive film 42 to protect from outside air intrusion is inserted between the package member 41 and the leads 31, 32. The adhesive film 42 is made of a material having contact characteristics to the leads 31 and 32, for example, a polyolefin resin such as polyethylene, polypropylene, modified polyethylene, and modified polypropylene.

The package member 41 can be made of a laminated film having other structure, a high molecular weight film such as polypropylene, or a metal film, instead of the foregoing aluminum laminated film.

Figure 4:
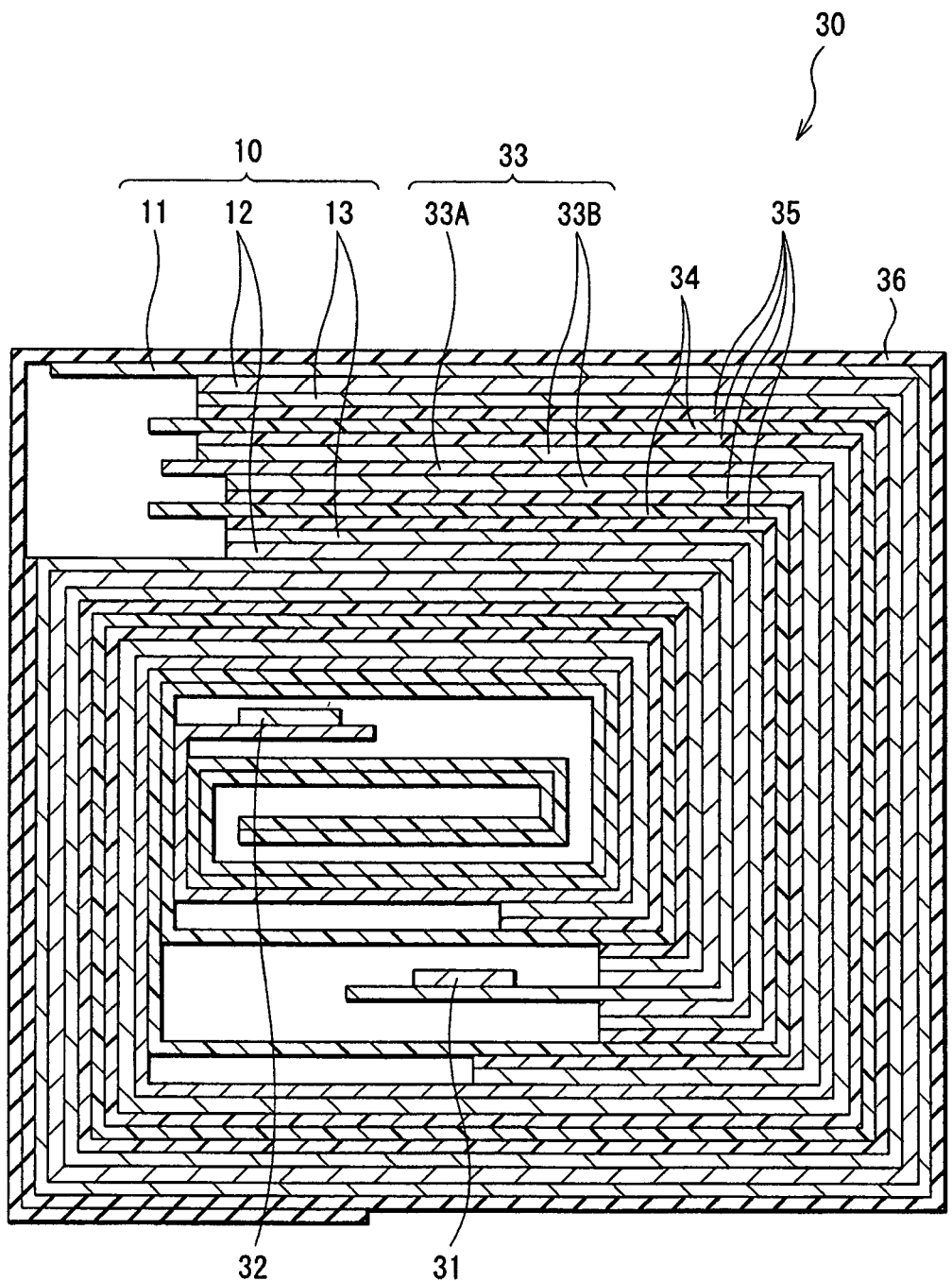
FIG. 4 is a cross section showing a structure taken along line I-I of a spirally wound electrode body shown in FIG. 3.

FIG. 4 shows a cross sectional structure taken along line I-I of the spirally wound electrode body 30 shown in FIG. 3. In the spirally wound electrode body 30, the anode 10 and a cathode 33 are layered with a separator 34 and an electrolyte layer 35 inbetween and wound, and an outermost circumferential portion thereof is protected by a protective tape 36.

The anode 10 has a structure in which the anode active material layer 12 is provided on a single side or both sides of the anode current collector 11. The cathode 33 also has a structure in which a cathode active material layer 33B is provided on a single side or both sides of a cathode current collector 33A. Arrangement is made so that the cathode active material layer 33B side is face to the anode active material layer 12. Structures of the cathode current collector 33A, the cathode active material layer 33B, and the separator 34 are similar to of the foregoing cathode current collector 23A, the cathode active material layer 23B, and the separator 24.

The electrolyte layer 35 is made of a so-called gelatinous electrolyte in which an electrolytic solution is held in a holding body. The gelatinous electrolyte is preferable since the gelatinous electrolyte can provide high ion conductivity and can prevent liquid leakage of the battery or expansion at high temperatures. The structure of the electrolytic solution (that is, a solvent and an electrolyte salt) is similar to that of the coin type secondary battery shown in FIG. 2. The holding body is made of, for example, a high molecular weight material. Examples of the high molecular weight material include polyvinylidene fluoride.

The secondary battery can be manufactured as follows, for example.

First, the electrolyte layer 35 in which the electrolytic solution is held in the holding body is formed on the anode 10 and the cathode 33, respectively. After that, the lead 31 is attached to an end of the anode current collector 11 by welding, and the lead 32 is attached to an end of the cathode current collector 33A by welding. Next, after making a lamination by layering the anode 10 and the cathode 33, on which the electrolyte layer 35 is formed, with the separator 34 inbetween, the lamination is wound in its longitudinal direction, the protective tape 36 is bonded to the outermost circumferential portion to form the spirally wound electrode body 30. Finally, for example, the spirally wound electrode body 30 is sandwiched between the package members 41, and the spirally wound electrode body 30 is enclosed therein by contacting outer edges of the package members 41 by heat fusion bonding or the like. At this time, the adhesive film 42 is inserted between the leads 31, 32 and the package member 41. Thereby, the secondary battery shown in FIGS. 3 and 4 is completed.

The secondary battery operates as the coin type secondary battery shown in FIG. 2 does.

As above, in this embodiment, the average oxygen content in the anode active material layer 12 is 40 atom % or less, the average oxygen content on the current collector side A is larger than the average oxygen content on the surface side B, and the difference therebetween, A−B is from 4 atom % to 30 atom %. Therefore, expansion and shrinkage of the anode active material layer 12 in the vicinity of the anode current collector 11 can be particularly inhibited. In the result, the anode active material layer 12 is prevented from separating from the anode current collector 11, and battery characteristics such as cycle characteristics can be improved.

In particular, when the average oxygen content in the anode active material layer 12 is 10 atom % or more, higher effect can be obtained.

EXAMPLES

Further, detailed descriptions according to various embodiments will be given of specific examples with reference to the figures. In the following examples, reference numbers and symbols used in the foregoing embodiment are correspondingly used as it is.

Examples 1-1 to 1-6

Secondary batteries shown in FIGS. 3 and 4 were fabricated. First, on the anode current collector 11 made of a copper foil, the anode active material layer 12 containing silicon was formed by using a silicon target by sputtering method. Then, as discharge gas, mixed gas of argon gas and oxygen gas was used when starting deposition until the half of the thickness of the anode active material layer 12, and then argon gas was used. The flow rate of the discharge gas was constant at 50 cm3/min, and the flow ratio of the oxygen gas in the initial deposition period was changed in Examples 1-1 to 1-6.

Further, lithium cobaltate (LiCoO2) powders having an average particle diameter of 5 μm, which was the cathode active material, carbon black as the conductive material, polyvinylidene fluoride as the binder were mixed at a mass ratio of lithium cobaltate:carbon black:polyvinylidene fluoride=92:3:5, and the mixture was put in N-methyl-2-pyrrolidone as the dispersion medium to obtain a mixture slurry. After that, the cathode current collector 33A made of an aluminum foil was coated with the mixture slurry, the resultant was dried and pressurized to form the cathode active material layer 33B. Consequently, the cathode 33 was formed.

After the anode 10 and the cathode 33 were fabricated, the anode 10 and the cathode 33 were coated with a precursor solution obtained by mixing and dissolving 10 wt % of polyvinylidene fluoride as the block copolymer having a weight average molecular mass of 0.6 million and 60 wt % of dimethyl carbonate as the mixed solvent in 0.30 wt % of an electrolytic solution composed of 37.5 wt % of ethylene carbonate, 37.5 wt % of propylene carbonate, 10 wt % of vinylene carbonate, and 15 wt % of LiPF6. The resultant was left for eight hours at ambient temperatures to volatilize dimethyl carbonate, and thereby forming the electrolyte layer 35.

After the electrolyte layer 35 was formed, the anode 10 and the cathode 33 on which the electrolyte layer 35 was formed were layered with the separator 34 inbetween, and wound in the longitudinal direction. The protective tape 36 was adhered to the outermost circumferential portion to form the spirally wound electrode body 30. For the separator 34, the polypropylene film was used. After that, the spirally wound electrode body 30 was sandwiched and enclosed inside the package member 41 made of an aluminum laminated film. Thereby, the secondary batteries of Examples 1-1 to 1-6 were obtained.

As Comparative example 1-1 relative to Examples 1-1 to 1-6, a secondary battery was fabricated as in Examples 1-1 to 1-6, except that oxygen gas was not mixed within the discharge gas in forming the anode active material layer 12. Further, as Comparative examples 1-2 and 1-3, secondary batteries were fabricated as in Examples 1-1 to 1-6, except that the flow rate ratio of oxygen gas in the discharge gas in forming the anode active material layer 12 was changed.

Regarding the fabricated secondary batteries of Examples 1-1 to 1-6 and Comparative examples 1-1 to 1-3, a charge and discharge test was performed under the condition of 25 deg C., and the capacity retention ratio at the 101st cycle to the second cycle was obtained. Then, charge was performed until a battery voltage reached 4.2 V at a constant current density of 1 mA/cm$^2$, and then charge was performed until a current density reached 0.05 mA/cm$^2$ at a constant voltage of 4.2 V. Discharge was performed until a battery voltage reached 2.5 V at a constant current density of 1 mA/cm$^2$. When charge was performed, the utilization ratio of the capacity of the anode 10 was set to 90% to prevent lithium metal from being deposited into the anode 10. The capacity retention ratio was calculated as a ratio of a discharge capacity at the 101st cycle to the discharge capacity at the second cycle, that is, as (discharge capacity at the 101st cycle/discharge capacity at the second cycle)×100. Obtained results are shown in Table 1.

Figure 5:
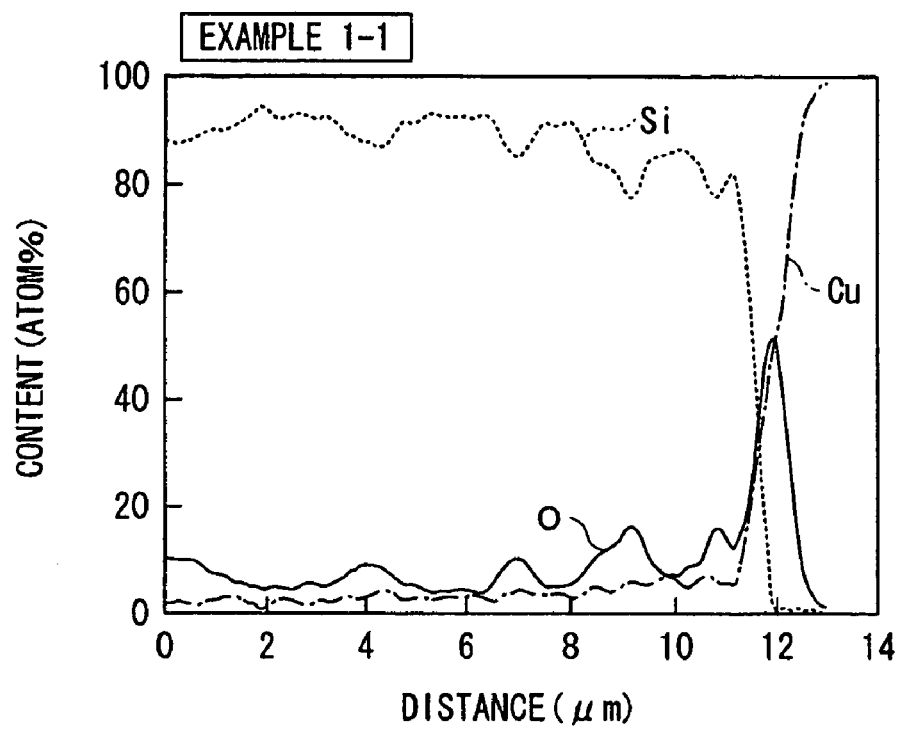
FIG. 5 is a characteristics view showing a result of Auger Electron Spectroscopy measurement of Example 1-1.
Figure 6:
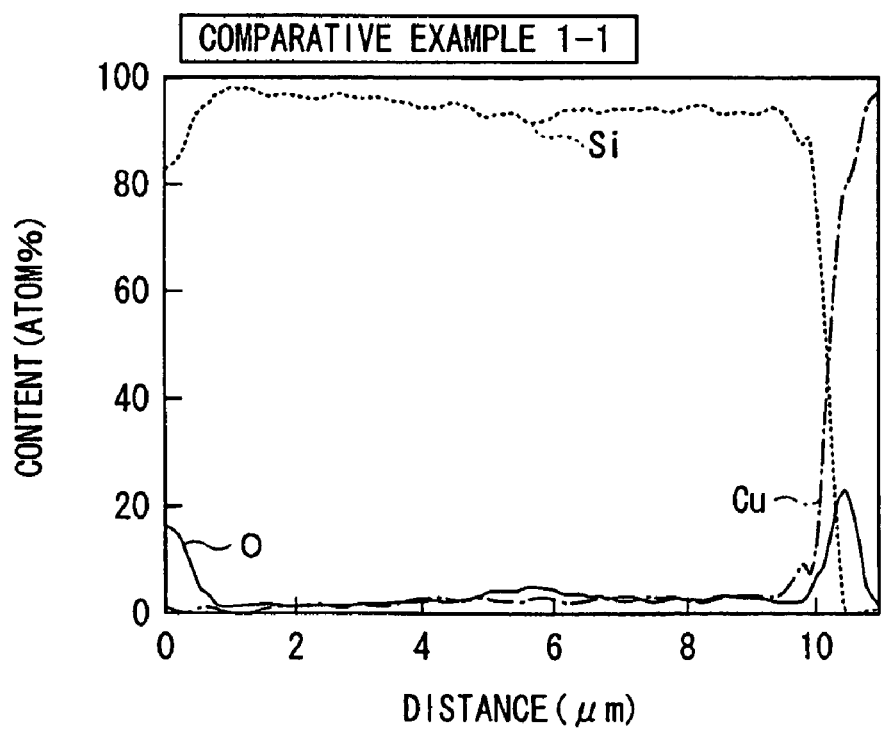
FIG. 6 is a characteristics view showing a result of Auger Electron Spectroscopy measurement of Comparative example 1-1.

Further, regarding the fabricated secondary batteries of Examples 1-1 to 1-6 and Comparative examples 1-1 to 1-3, after one cycle charge and discharge was performed, the secondary batteries were disassembled. The anode 10 was taken out, washed with dimethyl carbonate, dried, and the cross section of the anode 10 was clipped by focused ion beam. After that, regarding the clipped cross section, the oxygen content in the anode active material layer 12 was measured by line analysis of Auger Electron Spectroscopy. The oxygen content was measured for randomly selected five measuring points, and the average value was calculated. The results are shown in Table 1. Further, as an example, the result of Auger Electron Spectroscopy measurement of Example 1-1 is shown in FIG. 5, and the result of Auger Electron Spectroscopy measurement of Comparative example 1-1 is shown in FIG. 6.

TABLE 1

| | Anode active material Layer | | | | | |
|---|---|---|---|---|---|---|
| | | Average oxygen content (atom %) | | | | |
| | Forming Method | Whole | Current collector side A | Surface side B | A − B | Capacity retention ratio (%) |
| Example 1-1 | Sputtering | 7.0 | 9.2 | 4.7 | 4.5 | 76 |
| Example 1-2 | Sputtering | 9.5 | 13.2 | 5.8 | 7.4 | 78 |
| Example 1-3 | Sputtering | 11.4 | 16.2 | 6.5 | 9.7 | 80 |
| Example 1-4 | Sputtering | 13.16 | 20.5 | 6.7 | 13.8 | 81 |
| Example 1-5 | Sputtering | 18.9 | 30.5 | 7.2 | 23.3 | 82 |
| Example 1-6 | Sputtering | 25.9 | 40.5 | 11.2 | 29.3 | 80 |
| Comparative example 1-1 | Sputtering | 2.7 | 3.2 | 2.1 | 1.1 | 70 |
| Comparative example 1-2 | Sputtering | 5.9 | 7.7 | 4.0 | 3.7 | 72 |
| Comparative example 1-3 | Sputtering | 30.4 | 46.6 | 14.1 | 32.5 | 69 |

As shown in Table 1, according to Examples 1-1 to 1-6, in which the difference between the average oxygen content on the current collector side A and the average oxygen content on the surface side B, A–B was in the range from 4 atom % to 30 atom %, the higher capacity retention ratio was obtained compared to other Comparative examples 1-1 to 1-3. Further, there was a trend that when the average oxygen content in the anode active material layer 12 and the difference between the average oxygen content on the current collector side A and the average oxygen content on the surface side B, A–B were increased, the capacity retention ratio was improved and then decreased.

In other words, it was found that when the difference between the average oxygen content on the current collector side A and the average oxygen content on the surface side B, A–B was in the range from 4 atom % to 30 atom %, cycle characteristics could be improved. Further, it was found that it was more preferable that the average oxygen content in the anode active material layer 12 was 10 atom % or more.

Examples 2-1 to 2-5

Secondary batteries were fabricated as in Examples 1-1 to 1-6, except that mixed gas of argon gas and oxygen gas was used as discharge gas, the flow rate ratio of the oxygen gas was gradually decreased as deposition proceeded, and the flow rate ratio of the oxygen gas was changed in Examples 2-1 to 2-5 in forming the anode active material layer 12. Further, as Comparative examples 2-1 and 2-2 relative to Examples 2-1 to 2-5, secondary batteries were fabricated as in Examples 2-1 to 2-5, except that the flow rate ratio of oxygen in the discharge gas was changed from those of Examples 2-1 to 2-5.

Figure 7:
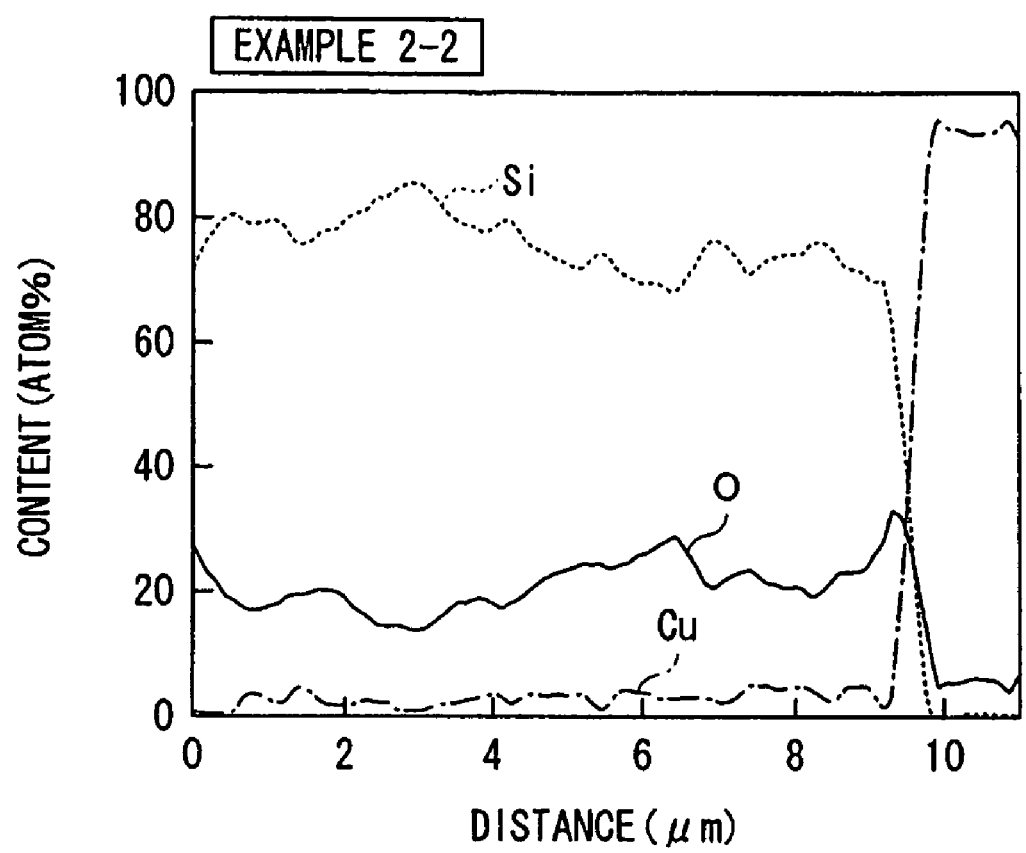
FIG. 7 is a characteristics view showing a result of Auger Electron Spectroscopy measurement of Example 2-2.

Regarding the secondary batteries of Examples 2-1 to 2-5 and Comparative examples 2-1 and 2-2, charge and discharge was performed and the capacity retention ratio was obtained as in Examples 1-1 to 1-6. Further, as in Examples 1-1 to 1-6, the oxygen content in the anode active material layer 12 was measured. The results are shown in Table 2 together with the results of Comparative example 1-1. Further, as an example, the result of Auger Electron Spectroscopy measurement of Example 2-2 is shown in FIG. 7.

TABLE 2

| | | Anode active material Layer | | | | |
|---|---|---|---|---|---|---|
| | | Average oxygen content (atom %) | | | | |
| | Forming Method | Whole | Current collector side A | Surface side B | A − B | Capacity retention ratio (%) |
| Example 2-1 | Sputtering | 16.0 | 18.4 | 13.5 | 4.9 | 84 |
| Example 2-2 | Sputtering | 20.6 | 23.5 | 17.6 | 5.9 | 86 |
| Example 2-3 | Sputtering | 31.1 | 33.8 | 28.3 | 5.5 | 80 |
| Example 2-4 | Sputtering | 34.8 | 37.7 | 31.9 | 5.8 | 81 |
| Example 2-5 | Sputtering | 39.6 | 42.2 | 36.9 | 5.3 | 80 |
| Comparative example 1-1 | Sputtering | 2.7 | 3.2 | 2.1 | 1.1 | 70 |
| Comparative example 2-1 | Sputtering | 16.0 | 17.8 | 14.2 | 3.6 | 65 |
| Comparative example 2-2 | Sputtering | 42.1 | 45.8 | 38.3 | 7.5 | 69 |

As shown in Table 2, according to Examples 2-1 to 2-5, in which the average oxygen content in the anode active material layer 12 was 40 atom % or less and the difference between the average oxygen content on the current collector side A and the average oxygen content on the surface side B, A–B was in the range from 4 atom % to 30 atom %, the higher capacity retention ratio was obtained compared to other Comparative examples 1-1, 2-1, and 2-2. That is, it was found that when the average oxygen content in the anode active material layer 12 was 40 atom % or less and the difference between the average oxygen content on the current collector side A and the average oxygen content on the surface side B, A–B was in the range from 4 atom % to 30 atom %, cycle characteristics could be improved.

Examples 3-1 to 3-4

Secondary batteries were fabricated as in Examples 1-1 to 1-6, except that the anode active material layer 12 was formed by electron beam vacuum deposition method (EB deposition method). Then, in Examples 3-1 and 3-2, oxygen gas was introduced only at the deposition start, and in Examples 3-3 and 3-4, the flow rate ratio of oxygen gas was gradually decreased as deposition proceeded. Further, as Comparative examples 3-1 and 3-2 relative to Examples 3-1 to 3-4, secondary batteries were fabricated as in Examples 3-1 to 3-4, except that the flow rate ratio of oxygen was changed. In Comparative example 3-1, oxygen gas was introduced only at deposition start, and in Comparative example 3-2, the flow rate ratio of oxygen gas was gradually decreased as deposition proceeded.

Regarding the secondary batteries of Examples 3-1 to 3-4 and Comparative examples 3-1 and 3-2, charge and. discharge was performed and the capacity retention ratio was obtained as in Examples 1-1 to 1-6. Further, as in Examples 1-1 to 1-6, the oxygen content in the anode active material layer 12 was measured. The results are shown in Table 3.

TABLE 3

| | | Anode active material Layer | | | | |
|---|---|---|---|---|---|---|
| | | Average oxygen content (atom %) | | | | |
| | Forming Method | Whole | Current collector side A | Surface side B | A − B | Capacity retention ratio (%) |
| Example 3-1 | EB deposition | 9.2 | 11.8 | 6.5 | 5.3 | 86 |
| Example 3-2 | EB deposition | 15.9 | 19.6 | 12.1 | 7.5 | 90 |
| Example 3-3 | EB deposition | 23.0 | 28.1 | 17.8 | 10.3 | 91 |
| Example 3-4 | EB deposition | 31.4 | 37.3 | 25.4 | 11.9 | 90 |
| Comparative example 3-1 | EB deposition | 6.3 | 7.2 | 5.4 | 1.8 | 79 |
| Comparative example 3-2 | EB deposition | 44.4 | 48.9 | 39.9 | 9.0 | 64 |

As shown in Table 3, as in Examples 1-1 to 1-6 and 2-1 to 2-5, regarding Examples 3-1 to 3-4, the higher capacity retention ratio was obtained compared to in Comparative examples 3-1 and 3-2. That is, it was found that even when the anode active material layer 12 was fabricated by other manufacturing method, cycle characteristics could be improved as long as the oxygen content was set to the value described above.

While the present invention has been described with reference to the embodiment and examples, the present invention is not limited to the foregoing embodiment and examples, and various modifications may be made. For example, in the foregoing embodiment and examples, descriptions have been given of the case, in which the high molecular weight material was used as a holding body for the electrolyte.

However, an inorganic conductor such as lithium nitride and lithium phosphate can be used as a holding body. Further, a mixture of a high molecular weight material and an inorganic conductor can be used.

Further, in the foregoing embodiment and examples, the anode 10, in which the anode current collector 11 is provided with the anode active material layer 12 has been described. However, other layers can be provided between the anode current collector and the anode active material layer.

Further, in the foregoing embodiment and examples, the coin type and the winding laminated type secondary batteries have been described. However, the present invention can be applied similarly to secondary batteries such as cylinder type, square type, button type, thin type, large type and multilayer laminated type secondary batteries. Further, the present invention can be applied not only to the secondary batteries, but also to primary batteries.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode comprising:
an anode current collector; and
an anode active material layer which is provided on the anode current collector, and which is alloyed with the anode current collector at least in part of an interface with the anode current collector; wherein
the anode active material layer contains silicon and oxygen;
the average oxygen content in the anode active material layer is 40 atom % or less; and
when the average oxygen content on a current collector side is A and the average oxygen content on a surface side is B where the anode active material layer is divided into two in a thickness direction, the average oxygen content on the current collector side A is larger than the average oxygen content on the surface side B, and the difference therebetween, ranges from 4 atom % to 30 atom %.

2. An anode according to claim 1, wherein the average oxygen content in the anode active material layer is 10 atom % or more.

3. An anode comprising:
an anode current collector; and
an anode active material layer which is formed on the anode current collector by at least one of vapor-phase deposition, thermal spraying, and firing, wherein
the anode active material layer contains silicon and oxygen;
the average oxygen content in the anode active material layer is 40 atom % or less; and
when the average oxygen content on a current collector side is A and the average oxygen content on a surface side is B where the anode active material layer is divided into two in the thickness direction, the average oxygen content on the current collector side A is larger than the average oxygen content on the surface side B, and the difference therebetween, (A−B) ranges from 4 atom % to 30 atom %.

4. A battery comprising:
a cathode;
an anode; and
an electrolyte, wherein
the anode has an anode current collector and an anode active material layer which is provided on the anode current collector, and which is alloyed with the anode current collector at least in part of an interface with the anode current collector,
the anode active material layer contains silicon and oxygen,
the average oxygen content in the anode active material layer is 40 atom % or less, and
when the average oxygen content on a current collector side is A and the average oxygen content on a surface side is B where the anode active material layer is divided into two in the thickness direction, the average oxygen content on the current collector side A is larger than the average oxygen content on the surface side B, and the difference therebetween, (A−B) ranges from 4 atom % to 30 atom %.

5. A battery according to claim 4, wherein the average oxygen content in the anode active material layer is 10 atom % or more.

6. A battery comprising:
a cathode;
an anode; and
an electrolyte, wherein
the anode has an anode current collector and an anode active material layer which is formed on the anode current collector by at least one of vapor-phase deposition, thermal spraying, and firing,
the anode active material layer contains silicon and oxygen,
the average oxygen content in the anode active material layer is 40 atom % or less; and
when the average oxygen content on a current collector side is A and the average oxygen content on a surface side is B where the anode active material layer is divided into two in the thickness direction, the average oxygen content on the current collector side A is larger than the average oxygen content on the surface side B, and the difference therebetween, (A−B) ranges from 4 atom % to 30 atom %.

* * * * *